United States Patent [19]

Itaya et al.

[11] Patent Number: 5,181,030
[45] Date of Patent: Jan. 19, 1993

[54] INPUT SYSTEM INCLUDING RESISTANCE FILM TOUCH PANEL AND PUSHED POSITION DETECTING DEVICE

[75] Inventors: Hisao Itaya, Moriyama; Kazuhiko Akebi, Kurita; Minoru Okabe; Satoru Nakagawa, both of Moriyama, all of Japan

[73] Assignee: Gunze Limited, Ayabe, Japan

[21] Appl. No.: 614,410

[22] Filed: Nov. 16, 1990

[30] Foreign Application Priority Data

Dec. 28, 1989 [JP] Japan .................................. 1-340758
Mar. 22, 1990 [JP] Japan .............................. 2-30219[U]

[51] Int. Cl.⁵ .......................................... H03K 17/94
[52] U.S. Cl. ........................................ 341/20; 178/18; 340/706
[58] Field of Search ......................... 341/20, 22, 24, 25, 341/26; 178/18, 19, 20; 340/706, 712; 338/99, 114; 382/3, 4

[56] References Cited

U.S. PATENT DOCUMENTS

| | | | |
|---|---|---|---|
| 3,885,097 | 5/1975 | Pobgee | 178/18 |
| 4,149,029 | 4/1979 | Pobgee | 178/18 |
| 4,571,454 | 2/1986 | Tamaru et al. | 178/18 |
| 4,571,577 | 2/1986 | Taupin et al. | 178/18 |
| 4,636,582 | 1/1987 | Moriwaki et al. | 178/18 |

Primary Examiner—Donald J. Yusko
Assistant Examiner—Robert Gray
Attorney, Agent, or Firm—Armstrong & Kubovcik

[57] ABSTRACT

An input system including a resistance film touch panel and a pushed position detecting device for detecting two-dimensional coordinates of a pushed position of a touch panel based on surface resistance values of resistance films, the system comprising a pair of insulating base layers opposed to each other with a certain distance therebetween; a spacer provided between the insulating base layers for keeping the layers apart but for allowing the layers to approach each other when an external force is applied to one of the layers; a first resistance film extended in first and second directions and provided on an inner surface of one of the layers, the first and second directions crossing each other perpendicularly and the first resistance film having outer connecting electrodes on both ends thereof along the second direction; and a plurality of second resistance films provided on an inner surface of the other of the layers, the second resistance films each being a lengthy strip extended in a direction crossing the second direction and having first and second outer connecting electrodes at both ends thereof.

9 Claims, 12 Drawing Sheets

INPUT SYSTEM INCLUDING RESISTANCE FILM TOUCH PANEL AND PUSHED POSITION DETECTING DEVICE

BACKGROUND OF THE INVENTION

(1) Field of the Invention

This invention relates to an input system comprising a resistance film touch panel and a device for detecting a pushed position of the touch panel, especially the one including a device for conducting the above detection by use of a change in electric potential which occurs when the touch panel is pushed.

(2) Description of the Prior Art

A simple input system including a touch panel and a detecting device for detecting a pushed position of the touch panel and for outputting a signal which indicates the two-dimensional coordinates of the position is widely used in combination with a character display device (CRT, LCD or PDP) or the like.

In an input system including a resistance film touch panel, a pushed position of the touch panel, namely, the position where two resistance films are contacted on each other, is detected based on the resistance value of the position—contrary to using capacitance.

Conventionally, two types of touch panels comprising resistance films have been offered: analog system touch panels and matrix system touch panels.

Figure 1:
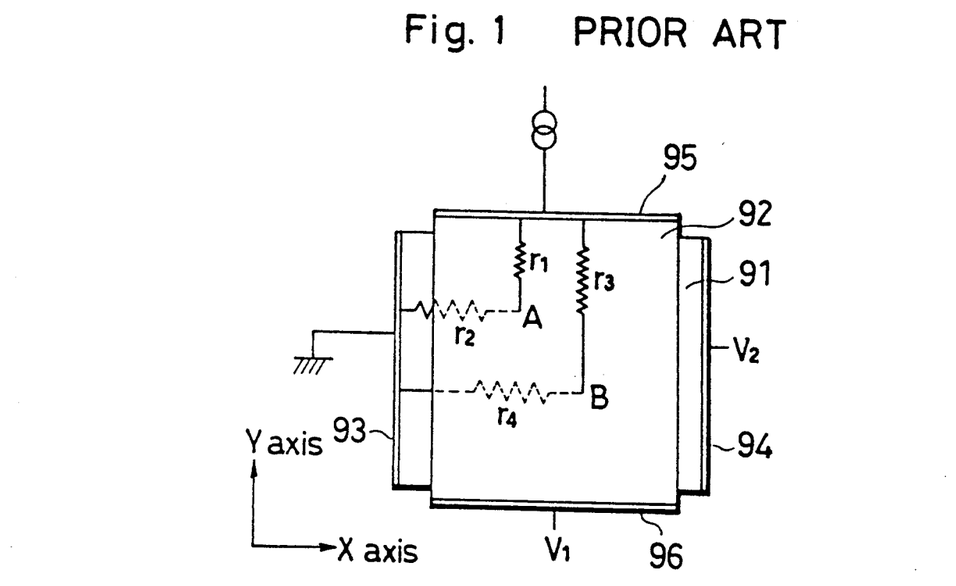
FIGS. 1 and 2 are views showing conventional touch panels.

FIG. 1 shows an analog system touch panel. Two resistance films 91 and 92 are opposed to each other with a certain distance therebetween. The film 91 has outer connecting electrodes 93 and 94 along ends thereof, the ends extending along a Y axis; and the film 92 has outer connecting electrodes 95 and 96 along ends thereof, the ends extending along an X axis. In this construction, a pushed position A or B is detected by obtaining a resistance value $r_1$ or $r_3$ between the position A or B and the outer connecting electrode 95 and a resistance value $r_2$ or $r_4$ between the position A or B and the outer connecting electrode 93 and then converting the obtained resistance values into a voltage, which is outputted through the electrodes 94 or 96.

If the two points A and B are pushed simultaneously, $r_1$ and $r_3$ are connected in parallel and $r_2$ and $r_4$ are connected in parallel, thereby combined resistances are formed. The voltage is divided by the combined resistances, resulting in finding a position which is neither A nor B. Therefore, accurate detection of two pushed positions are impossible with this construction.

Figure 2:
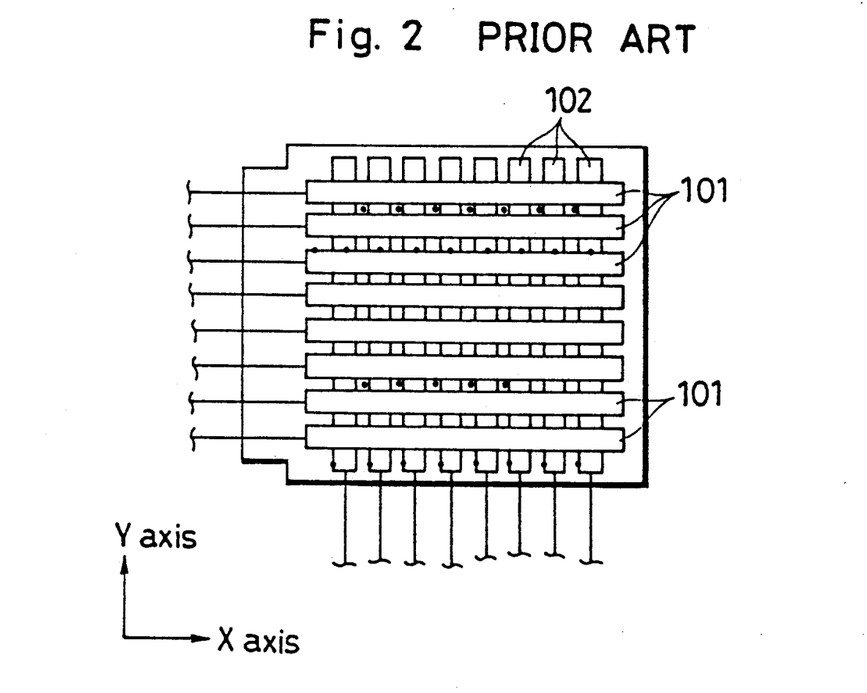

As shown in FIG. 2, a matrix system touch panel comprises a plurality of strip-like resistance films 101 arranged in parallel and a plurality of strip-like resistance films 102 arranged in parallel. The films 101 are extended along the X axis and the films 102 are extended along the Y axis, the films 101 and the films 102 having a certain distance therebetween. A pushed position is detected by finding out which films are contacted on each other by use of an appropriate scanner.

Since each film has a lead connected thereto, a great number of leads are necessary, which causes the wiring area to be too large compared with the detection area of the touch panel. Also required are a large number of input circuit components. These facts increase size of the system and manufacturing cost.

In an effort to minimize the number of the leads, touch panels are manufactured these days with various numbers of films for different usages. However, the necessity of manufacturing products with various numbers of films brings about another troublesome matter such as management of various components.

SUMMARY OF THE INVENTION

Accordingly, this invention has an object of offer an input system including a resistance film touch panel and a pushed position detecting device for accurately detecting two or more positions pushed simultaneously with a minimized number of leads.

The above object is fulfilled by an input system including a resistance film touch panel and a pushed position detecting device for detecting two-dimensional coordinates of a pushed position of a touch panel based on surface resistance values of resistance films, the system comprising a pair of insulating base layers opposed to each other with a certain distance therebetween; a spacer provided between the insulating base layers for keeping the layers apart but for allowing the layers to approach each other when an external force is applied to one of the layers; a first resistance film extended in first and second directions and provided on an inner surface of one of the layers, the first and second directions crossing each other perpendicularly and the first resistance film having outer connecting electrodes on both ends thereof along the second direction; and a plurality of second resistance films provided on an inner surface of the other of the layers, the second resistance films each being a lengthy strip extended in a direction crossing the second direction and having first and second outer connecting electrodes at both ends thereof.

The second resistance films may be extended in the first direction.

The second resistance films may each have a larger resistance value than the first resistance film.

The system may further comprise a first potential supplying device for supplying the first resistance film with a DC potential through one of the outer connecting electrodes of the first resistance film; a first switch electrically connected with all the outer connecting electrodes of the second resistance films one by one, alternately for the each second resistance film; a second switch switched in synchronization with the first switch and electrically connected to the outer connecting electrode which is opposed to the outer connecting electrode connected to the first switch; a second potential supplying device for supplying the second resistance films with a DC potential through the first switch; and an electric potential measuring device for measuring potentials of the second resistance films through the first switch.

The system may further comprise a DC potential supplying device including switching means for supplying a DC potential to the second resistance films one by one; a switching device switching at a speed at least twice as high as the DC potential supplying device, the switching device being for supplying a DC potential to the outer connecting electrodes of the first resistance film alternately; and an electric potential measuring device for measuring the potential of the outer connecting electrode of the first resistance film, the electrode being opposed to the electrode supplied with the DC potential by the switching device.

The above object may also be fulfilled by an input system including a resistance film touch panel and a pushed position detecting device for detecting two-dimensional coordinates of a pushed position of a touch panel based on surface resistance values of resistance films, the system comprising a pair of insulating base layers opposed to each other with a certain distance therebetween; a spacer provided between the insulating base layers for keeping the layers apart but for allowing the layers to approach each other when an external force is applied to one of the layers; a first resistance film extended in first and second directions and provided on an inner surface of one of the layers, the first and second directions crossing each other perpendicularly and the first resistance film having outer connecting electrodes on both ends thereof along the second direction; and a plurality of second resistance films provided on an inner surface of the other of the layers, the second resistance films each being a lengthy strip extended in a direction crossing the second direction, having a first outer connecting electrode at one end thereof, and sharing a second outer connecting electrode with the rest of the second resistance films at the other end thereof.

The system may further comprise a first DC potential supplying device for supplying the first resistance film with a DC potential through both the outer connecting electrodes of the first resistance film; a second DC potential supplying device for supplying a DC potential to the second outer connecting electrodes of the second resistance films; a switch electrically connected with the first outer connecting electrodes of the second resistance films one by one; and an electric potential measuring device for measuring potentials of the first outer connecting electrodes of the second resistance films through the switch.

The above object may also be fulfilled by a resistance film touch panel comprising an upper base layer having an upper surface on which an external force is applied and a lower surface on which a first resistance film extended two-dimensionally is formed; a lower base layer opposed to the upper base layer with a certain distance therebetween and having a plurality of lengthy strip-like second resistance films formed on a surface thereof, the surface being opposed to the lower surface of the upper base layer; and a spacer provided between the upper and lower base layers for keeping the layers apart but for, when the external force is applied on the upper base layer, allowing the first and the second resistance films to contact each other at a position corresponding to where the external force is applied.

The upper base layer may be a transparent film and the lower base layer is a transparent and hard plate.

The above object may also be fulfilled by an input system including a resistance film touch panel and a pushed position detecting device for detecting two-dimensional coordinates of a pushed position of a touch panel based on surface resistance values of resistance films, the system comprising a pair of insulating base layers opposed to each other with a certain distance therebetween; a spacer provided between the insulating base layers for keeping the layers apart but for allowing the layers to approach each other when an external force is applied to one of the layers; a first resistance film extended in first and second directions and provided on an inner surface of one of the layers, the first and second directions crossing each other perpendicularly and the first resistance film having outer connecting electrodes on both ends thereof along the second direction; and a plurality of second resistance films provided on an inner surface of the other of the layers, the second resistance films each being a lengthy strip extended in a direction crossing the second direction and having an outer connecting electrode at one end thereof.

The system may further comprise a DC potential supplying device for supplying the first resistance film with a DC potential through both the outer connecting electrodes thereof; a switching device switched to a first state of supplying all the outer connecting electrodes of the second resistance films with a ground-level potential and to a second state of releasing the same from the ground-level potential; and an electric potential measuring device for measuring the potentials of all the outer connecting electrodes of the second resistance films both in the first and the second states.

The pair of insulating base layers may consist of a flexible upper base layer on which an external force is applied and a hard lower base layer opposed to the upper base layer with a spacer therebetween, and the first resistance film is formed on a lower surface of the upper base layer and the second resistance films are formed on an upper surface of the lower base layer.

In the above construction, the resistance film on one surface is extended two-dimensionally. Since such film requires approximately only half electrodes compared with the matrix system touch panel as well as a smaller wiring area and fewer input circuit components, a simple construction is obtained with lower manufacturing cost. The strip-like resistance films on the other surface are selected one by one, thereby to detect a pushed position. Even if two or more positions are pushed simultaneously at least in the first or the second direction, the positions are accurately detected.

Also according to the above construction, the potentials at both ends of each strip-like resistance film are detected alternately. Even an area defined by two or more points is pushed, the outer periphery thereof can be detected with a small number of leads.

Further, when the touch panel comprises a resistance film extended two-dimensionally and formed on the upper base layer on which an external force is to be applied and a plurality of strip-like resistance films formed on the lower base layer, the touch panel is easy to manufacture and moreover, enhance yield rate for the following reason.

The upper base layer should be thin because it is to be pushed by a finger or the like. Much care should be taken in forming the resistance film on such a thin upper base layer. Since no laser trimming or other processing is necessary in forming the resistance film extended two-dimensionally in contrast to the strip-like ones, there is no worry of spoiling the upper base layer.

On the other hand, used for the lower base layer is a hard and thick plate which is tough enough to withstand laser trimming for forming the strip-like resistance films.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 2 is a plan view of a touch panel of an embodiment according to this invention;

DESCRIPTION OF THE PREFERRED EMBODIMENTS

A first embodiment according to this invention will be described with reference to FIG. 3 through 8.

Figure 3:
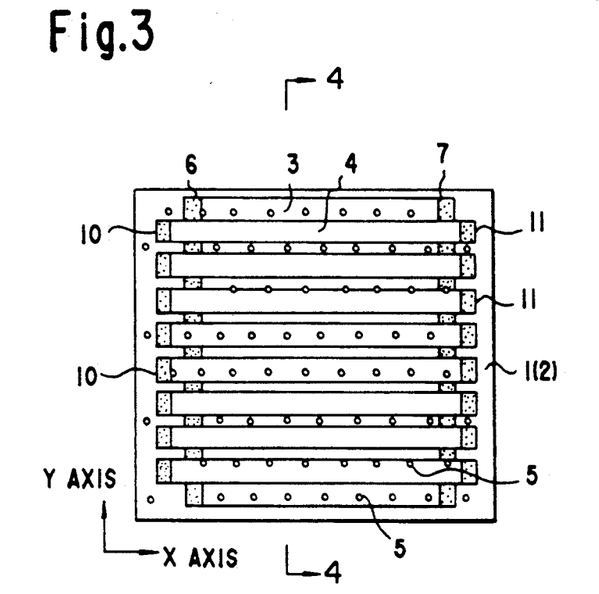
Figure 4:
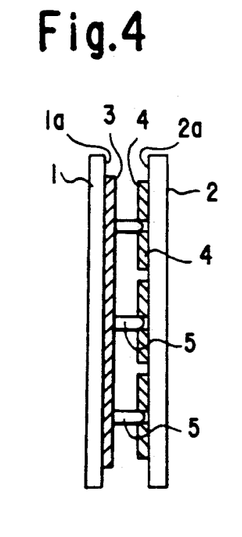
FIG. 4 is a cross sectional view along the A—A line of FIG. 3.

As shown in FIGS. 3 and 4, a touch panel of the system comprises two insulating base layers 1 and 2, a resistance film 3, a plurality of resistance films 4 (eight in this embodiment), and spacers 5 for keeping a certain distance between the resistance films 3 and 4. The films 3 and 4 are respectively formed on main surfaces 1a and 2a of the base layers 1 and 2.

The insulating base layers 1 and 2 are formed of transparent polyethylene terephthalete films in this embodiment. Also employable are glass, plastics and other insulating materials which have an appropriate flexibility or elasticity.

The resistance film 3 is extended along the X and Y axes crossing each other perpendicularly. The resistance film 3 desirably has a uniform surface resistance value (will be referred simply to resistance value, hereinafter) for accurate detection with the maximum tolerance of ±2%. Such a film is produced by sputtering, ion-plating or coating an oxide of indium and tin, other metals or metal oxides. The resistance film 3 has outer connecting electrodes (for example, formed of silver) at both ends thereof, the ends extending along the Y axis.

The resistance films 4 are lengthy strips arranged in parallel, each film being extended along the X axis. The resistance value of the film 4 is not required to be uniform but is favorably ten to a hundred times higher than that of the film 3 so that the resistance value of each film 4 may not affect the electric potential slope of the film 3 even if the film 4 is contacted on the film 3.

Figure 5A:
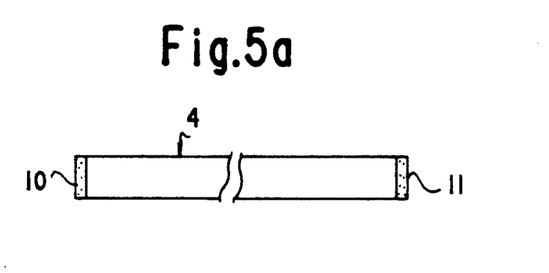
FIGS. 5a and 5b show examples of the construction of a resistance film.
Figure 5B:
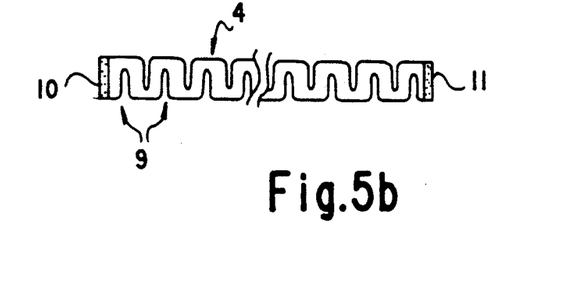

The resistance films 4 are formed, for example, by sputtering an oxide of indium and tin on the surface 2a before etching. Forming the films 4 of the same material as the film 3 as in this embodiment generates no problem since each film 4 has a bigger resistance value due to its smaller surface area compared with the film 3. The resistance value of each film 4 is further increased by making cutoffs 9 from both longer sides thereof alternately (FIG. 5b). With the cutoffs 9, the electric current path is half as wide and twice as long as the current path without the cutoffs (FIG. 5a). Therefore, the resistance value of the film 4 of FIG. 5b is four times higher than that of the film 4 of FIG. 5a. The resistance value can easily become a hundred times or more higher by making much more cutoffs. This type of resistance film is formed by screen printing or etching when only a small number of cutoffs are required, and by photolithography or laser processing when a large number of cutoffs are required.

Each film 4 has outer connecting electrodes 10 and 11 (formed of silver) at both ends thereof.

The films 4 may be provided in approximately the same number as the lines or rows of the conventional matrix system touch panel.

The spacers 5 are transparent cylinders formed of an insulating material and are provided in an appropriate number at appropriate positions so that they may not prevent the films 3 and 4 from contacting each other when the base film 2 is pushed. The spacers 5 may be non-transparent if the spacers 5 are small, and also may be small dots, globes, or semi-spheres.

Figure 6:
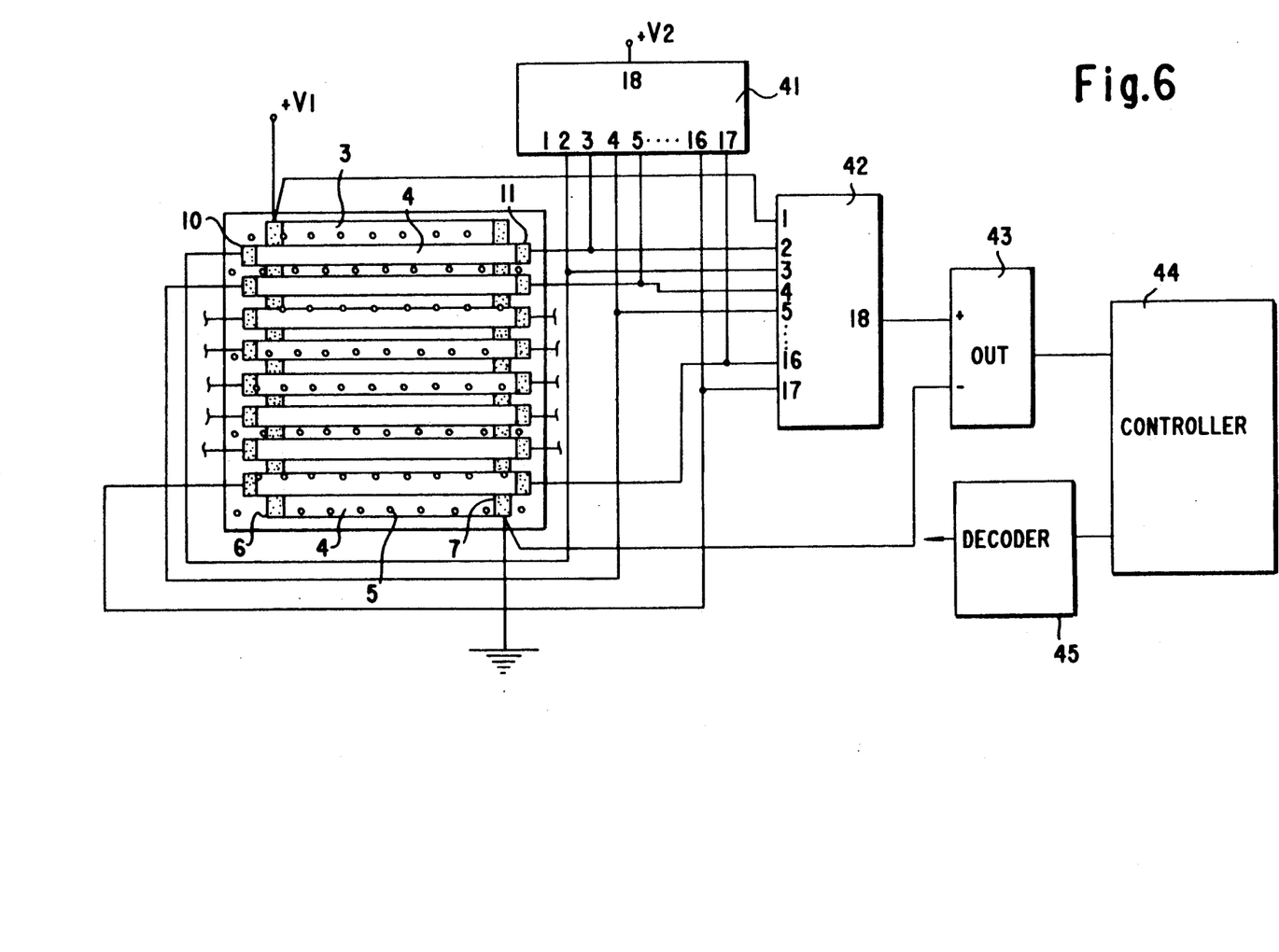
FIG. 6 shows an overall construction of the embodiment.

FIG. 6 shows an overall construction of the embodiment.

In FIG. 6, analog switches 41 and 42 have the same construction and are controlled to connect their respective terminals 1 through 17 to terminals 18 one by one, in synchronization concerning the same-numbered terminals, by the controller 44 through a decoder 45. The terminals which are not connected to the terminal 18 are kept at high impedance.

In the analog switch 41, the terminal 18 is supplied with a DC potential $V_2$ by an external power source, and the terminals 2 through 17 are to be connected with all the outer connecting electrodes 10 and 11, respectively. In this construction, $V_2$ is supplied to all the electrodes 10 and 11 one by one.

In the analog switch 42, the terminal 1 is supplied with a DC potential $V_1$, and the terminals 2 through 17 are to be connected with all the electrodes 10 and 11, respectively. The terminal 18 is connected to an A/D converter 43. In this construction, the potential which is supplied to the film 3 through the terminal 1 is outputted as the reference potential, thereafter the electric potentials of all the electrodes 10 and 11 are outputted one by one.

The terminals 2 through 17 of both analog switches 41 and 42 and the electrodes 10 and 11 have such a relationship that, while the electric potentials of the electrodes 10 and 11 are selectively outputted one by one, the analog switch 41 may apply $V_2$ to the electrode belonging to the same film 4 as the selected one does.

For measuring the resistance value, the electrode 6 of the film 3 is supplied with $V_1$, and the electrode 7 is grounded. The level of $V_2$ is desirably the same or higher than that of $V_1$.

The following is how this system is operated.

The terminals 1 of the analog switches 41 and 42 are selected by the command from the decoder 45. The terminals 1 and 18 of the analog switch 41 have low impedances (ON), but the terminal 1 is connected to nothing. Therefore, power is supplied to none of the films 4. On the other hand, the terminals 1 and 18 of the analog switch 42 are connected to each other. Accordingly, $V_1$ is A/D-converted by the A/D converter 43 and sent to the controller 44. The controller 44 stores the value of $V_1$ for easy detection of the X coordinate of the pushed position.

Then, the terminals 2 of the analog switches 41 and 42 are selected, thereby the electrode 10 of the uppermost film 4 gets $V_2$ through the terminal 18 of the analog switch 41. At this time, the potential of the electrode 11 of the same film 4 is conveyed to the terminals 2 and then 18, both of the analog switch 42, and to the controller 44 through the A/D converter 43.

If this potential is the same or higher than $V_1$ supplied to the film 3, the uppermost film 4 is not pushed. In this case, the terminals 4 of the analog switches 41 and 42 are selected, thereby the second uppermost film 4 is pushed or not is detected in the same manner.

If the potential of the electrode 11 of the uppermost film 4 is smaller than $V_1$, the uppermost film 4 is pushed. In this way, the Y coordinate of the pushed position is detected.

The X coordinate of the pushed position is detected in the following way.

Figure 7A:
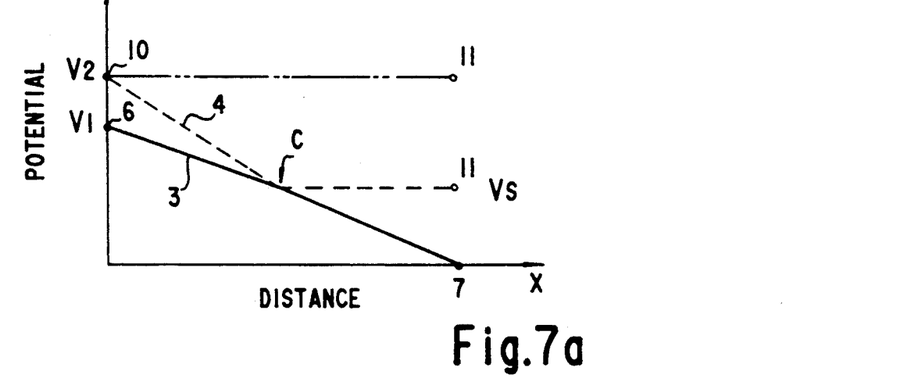
FIGS. 7a, 7b and 7c show the principle of detecting the pushed position.
Figure 7B:
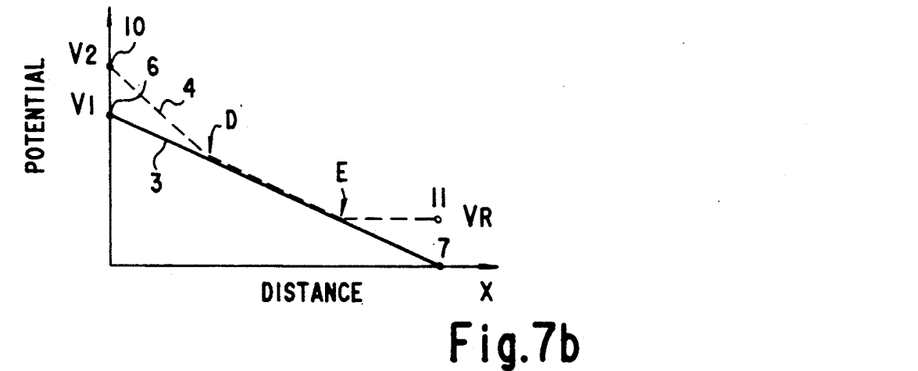
Figure 7C:
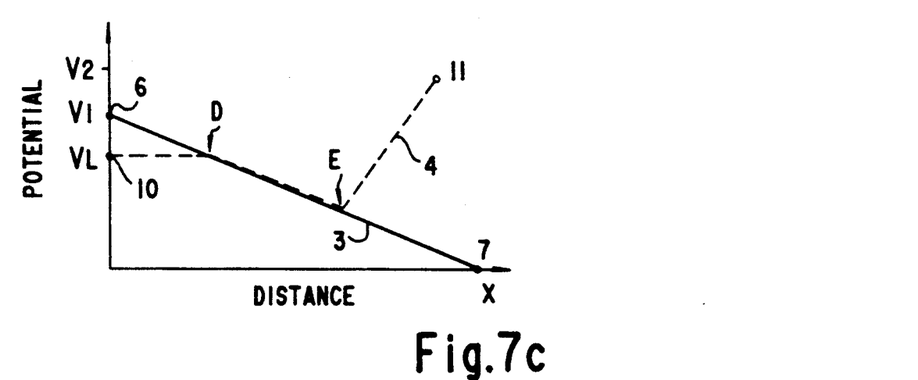

FIGS. 7a, 7b and 7c show the relationship between the pushed position along the X axis and the potentials of the electrodes 6, 7, 10 and 11. The solid line indicates the potential slope of the film 3. Concerning each film 4, the electrode 10 is supplied with $V_2$ and the electrode 11 has its potential measured through the analog switch 42. When the film 4 is not pushed, no power is supplied and therefore the potential of the electrode 11 is the same as $V_2$ of the electrode 10 as shown with the chained line (FIG. 7a). As mentioned before, the resistance value of the film 4 is too high to have any affect on the potential slope of the film 3. Accordingly, when the film 4 is pushed and contacted on the film 3 at a point C, the potential of the point C of the film 4 is lowered down to $V_S$, which is the same as that of the corresponding point of the film 3 (the dashed line of FIG. 7a). Then, the electrode 11 gets the same potential $V_S$. The controller 44 obtains the X coordinate of the point C by use of the difference between $V_S$ and $V_1$.

If the pushed position is not one point but a wider area, the detection is done as follows.

In FIG. 7b, points D and E indicate the left end and the right end of the pushed area, respectively. As apparent from FIG. 7b, the electrode 11 gets $V_R$, namely, the potential of the point E, based on which the X coordinate of the point E is detected.

After the potential of the electrode 11 is outputted, the decoder 45 commands the analog switches 41 and 42 to select the terminals 3. By this selection, the electrode 11 is supplied with $V_2$. On the other hand, the electrode 10 gets $V_L$, namely, the potential of point D (FIG. 7c), based on which the X coordinate of the point D is detected. In this way, the X coordinates of the two points are detected.

The potentials of the electrodes 10 and 11 of the other films 4 are obtained one by one in the same way, whereby the X and Y coordinates of all the points that define the pushed area are detected.

Figure 8:
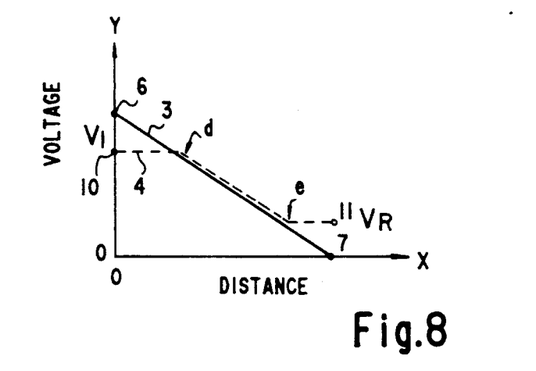
FIGS. 8, 9 and 10 show other embodiments of this invention.

In FIG. 6, a DC power source is connected to the terminal 18 of the analog switch 41 in order to supply a certain level of potential to the film 4 even when the film 4 is not pushed and thus to make the unpushed film distinct from the pushed film. The analog switch 41 and the DC power source may be eliminated so as to release the unpushed film from any potential although a little unstable electrically. In that case, the electrodes 10 and 11 of the pushed film 4 have $V_L$ and $V_R$ as shown in FIG. 8. In this construction, the potentials of all the electrodes 10 and 11 are selectively obtained by the analog switch 42 to detect the X coordinates of the points D and E.

Figure 9:
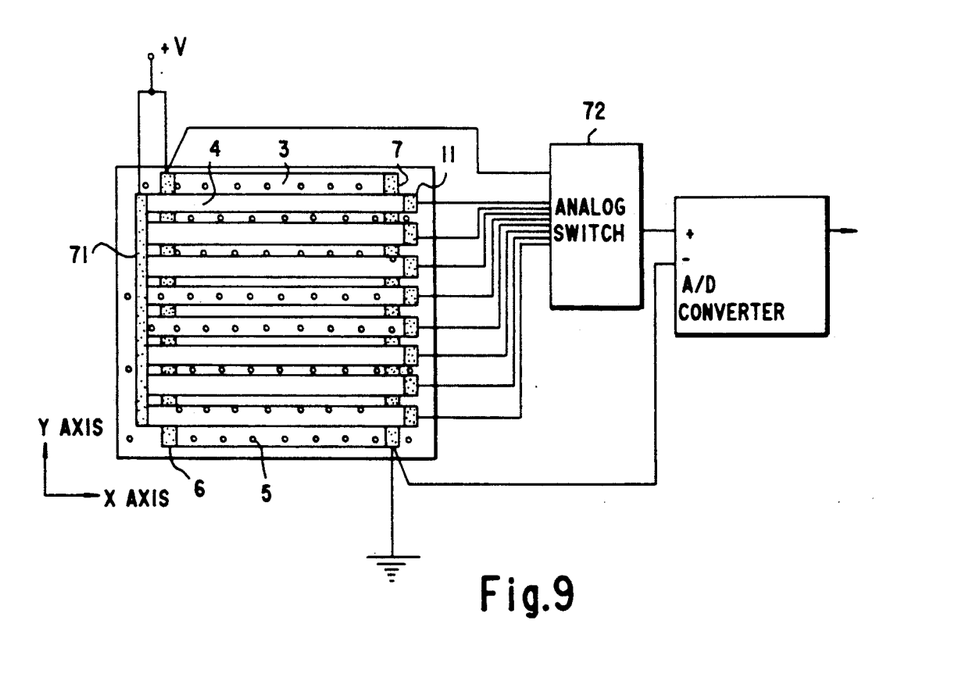

FIG. 9 shows a second embodiment according to this invention. This embodiment is distinct from the first embodiment except the followings. All the films 4 share by a common electrode 71 at one ends thereof, the electrode 71 being supplied with the same potential as the electrode 6. The potentials of the electrodes 11 are selectively obtained by an analog switch 72. The number of the terminals of the analog switch 72 is larger by one than the number of the films 4.

In this construction, if the film 4 is pushed at two or more points, only the rightmost point is detected along the X axis. Along the Y axis, however, all the coordinates can be detected by obtaining the potential of each film 4.

Figure 10:
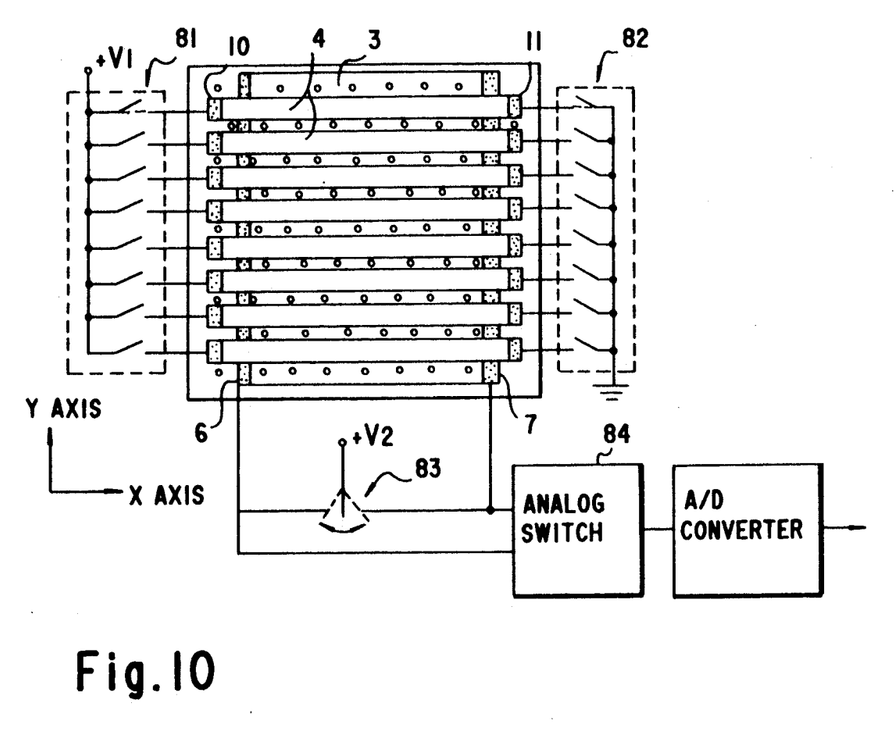

FIG. 10 shows a third embodiment according to this invention. The electrodes 10 are all to be connected to an analog switch 81 and the electrodes 11 are all to be connected to an analog switch 82. The analog switches 81 and 82 are controlled to supply $V_1$ to all the films 4 one by one, in synchronization concerning each film. The electrodes 6 and 7 of the film 3 are supplied with $V_2$ through a switch 83, which is switched twice as fast as the analog switches 81 and 82. The electrodes 6 and 7 are also connected to the A/D converter through an analog switch 84, which is switched as fast as but reversely to the switch 83. The output from the A/D converter is sent to a controller (not shown). The switches 81 through 84 are switched by the controller through a decoder (not shown).

In this construction, when the analog switches 81 and 82 select one of the films 4, the selected film 4 gets the potential slope based on $V_1$. At this time, the potentials of the electrodes 6 and 7 are obtained through the analog switch 84. This operation is repeated for all the films 4.

In this way, even if the film 4 is pushed at two or more points along the X axis, all the points can be detected. In this embodiment, each film 4 should have a uniform resistance value, which should be ten or a hundred times lower than that of the film 3.

A fourth embodiment of this invention will be described referring to FIGS. 11 through 14.

Figure 11:
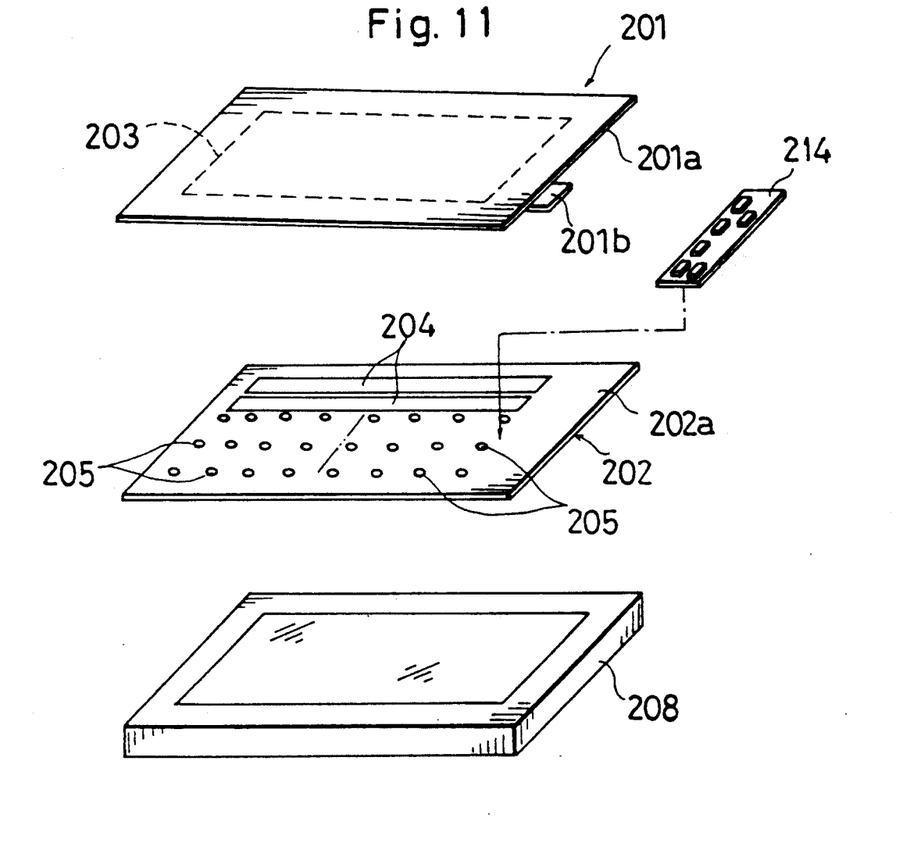
FIG. 11 is an exploded perspective view of still another embodiment of this invention.
Figure 12:
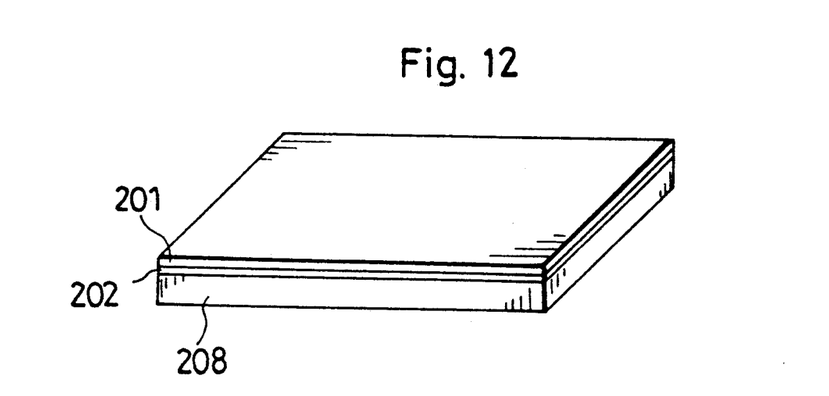
FIG. 12 is a view of the embodiment of FIG. 11 combined with a character display device.

This embodiment includes a touch panel comprising an insulating upper plate 201 to be pushed, an insulating lower plate 202, a transparent resistance film 203 formed on a lower surface 201a of the plate 201, a plurality of transparent resistance films 204 formed on an upper surface 202a of the plate 202, a cylindrical spacer 205 for keeping a certain distance between the resistance films 203 and 204, and a printed circuit board 214. The system is combined with a character display 208 (CRT, LCD, PDP or EL) as shown in FIG. 12. The spacer 205 is formed of an insulating material and may be small dots, globes or semi-spheres.

The upper plate 201 is formed of a polyethylene terephthalete film in this embodiment, but plastics or other insulating materials which have an appropriate flexibility or elasticity can also be used. The upper plate 201 has a projecting portion 201b for forming leading electrodes. The lower plate 202 is formed of, for example, transparent glass which is excellent in resistance against chemicals. Also acceptable are polycarbonate and hard plastics which have excellent resistance against chemicals and laser.

Figure 13:
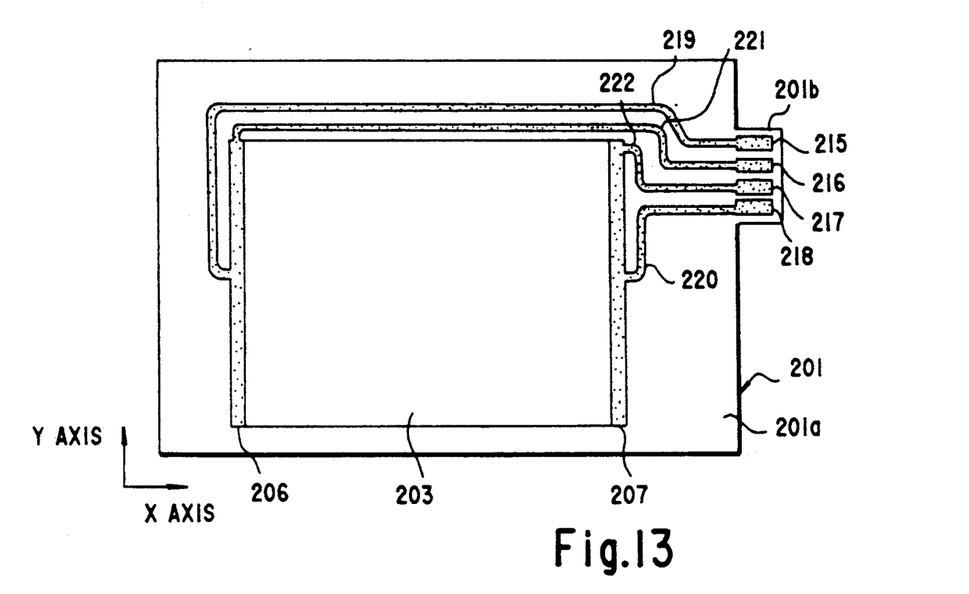
FIG. 13 is a bottom view of an upper plate of the embodiment of FIG. 11.

As shown in FIG. 13, the resistance film 203 is extended along the X and Y axes, which cross each other perpendicularly. The film 203 is produced in the same way as the film 3 of the first embodiment. The film 203 has outer connecting electrodes 206 and 207 (for example, formed of silver) along both ends thereof, the ends extending along the Y axis. The projecting portion 201b has leading electrodes 215 through 218. The leading electrodes 215 and 216 are both connected to the outer connecting electrode 206, respectively through a power supply line 219 and a voltage sensing line 221. The leading electrodes 217 and 218 are both connected to the outer connecting electrode 207, respectively through a voltage sensing line 222 and a power supply line 220. The power supply lines 219 and 220 have larger cross sections than the voltage sensing lines 221 and 222 in order to keep voltage drop small.

Figure 14:
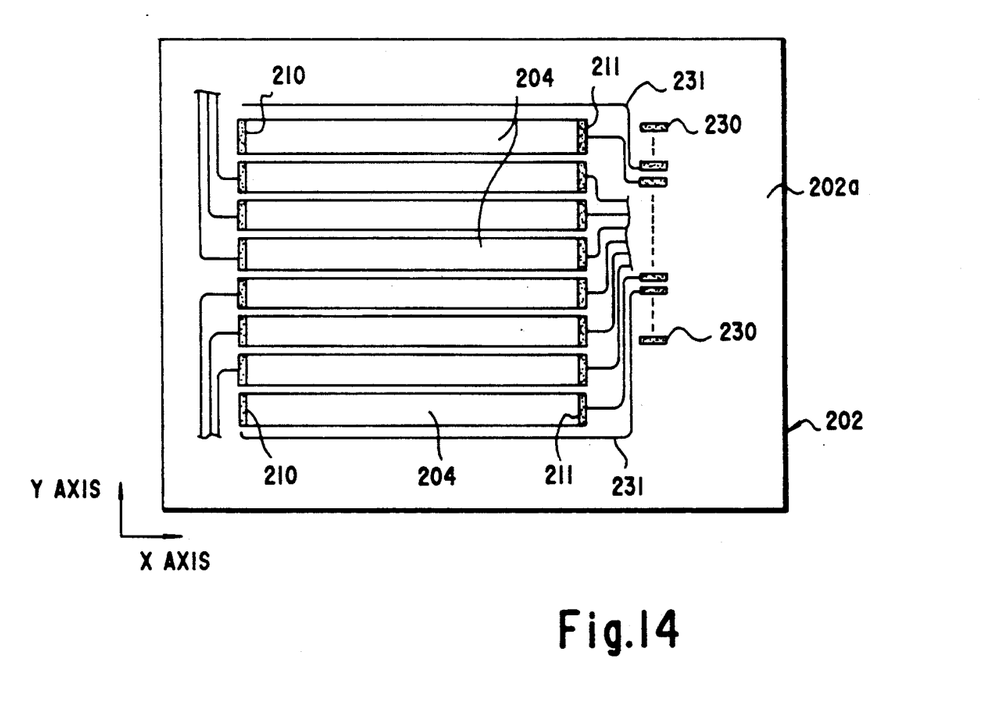
FIG. 14 is a top view of a lower plate of the embodiment of FIG. 11.

As shown in FIG. 14, the resistance films 204 are lengthy strips arranged in parallel, the films 204 extending along the X axis. The resistance films 204 are produced by sputtering an oxide of indium and tin on the surface 202a and then masking it with screen printing or photolithography before etching it. Laser processing can be used instead of etching.

Forming the films 204 of the same material as the film 203 as in this embodiment generates no problem since each film 204 has a bigger resistance value due to its smaller surface area compared with the film 203. The resistance value of each film 4 is further increased by employing the construction illustrated in FIG. 5b.

Each film 204 has outer connecting electrodes 210 and 211 (formed of carbon-coated silver) at both ends thereof, which are connected to leading electrodes 230 formed on the lower plate 202 through connecting lines 231.

Figure 15:
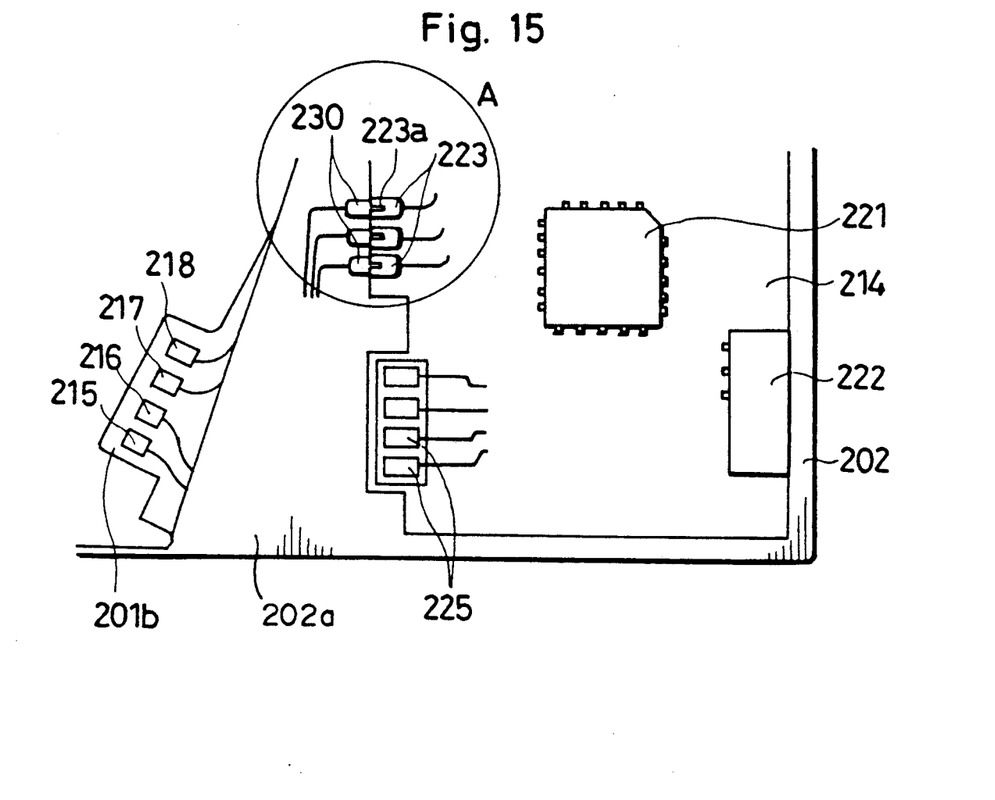
FIG. 15 is a view showing a printed circuit board of the system of FIG. 11.
Figure 16:
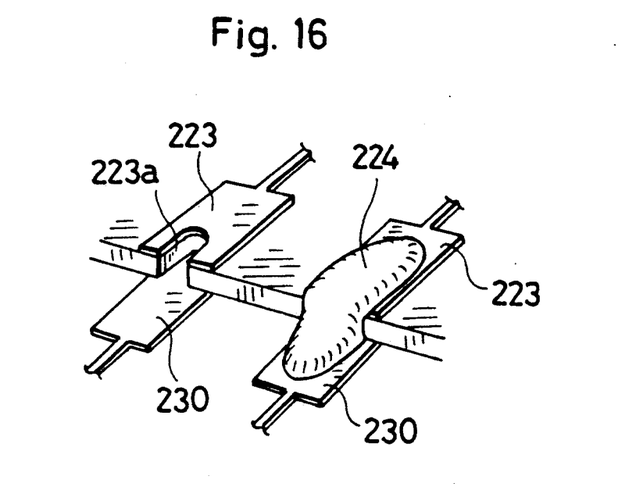
FIG. 16 is an enlarged view of the part A of FIG. 15.

As shown in FIG. 15, the printed circuit board 214 is fixed on the upper surface 202a of the lower plate 202 and has a chip component 221 such as an IC mounted thereon. The printed circuit board 214 further has a connecter 222 fixed at an outer end thereof. Formed at an inner end of the printed circuit board 214 are electrodes 223 to be connected to the electrodes 230 and electrodes 225 to be connected to the electrodes 215 through 218. Each electrode 225 is formed of anisotropic conductive film. Each electrode 223 has a cutout 223a, with which a solder 224 for soldering the electrodes 223 and 230 is securely fixed (FIG. 16).

A fifth embodiment of this invention will be described referring to FIG. 17.

The electrodes 210 of the resistance films 204 are supplied with a common potential $+V$ through serial resistances 276 and a common electrode 271. The serial resistances 276 are provided to regulate the amount of current flown into the resistance film 203 from the film 204 when the film 203 is pushed. If a DC voltage is directly supplied to the film 204 without the serial resistances 276, too much current is flown into the film 203, thereby to alter the potential slope between the pushed position and the electrode 207. This has an adverse influence on the accuracy of the pushed position detection. The electrode 206 of the film 203 is supplied with the potential $+V$ through an external resistance 273, and the electrode 207 is grounded through another external resistance 274.

The potentials $+V$ of the electrodes 206 and 207 of the film 203 are respectively led to reference inputs $V_{REF}(+)$ and $V_{REF}(-)$ of an A/D converter 272 through buffers 275. The potentials of the electrodes 211 of the film 204 are detected by the A/D converter 272 with a built-in analog switch. The A/D converter 272 has the same number of terminals with the number of the films 204.

In the above construction, if two or more positions of the same film 204 are contacted on the film 203, only the rightmost position is detected. Along the Y axis, however, all the pushed positions are detected by obtaining the potentials of all the films 204.

Figure 18:
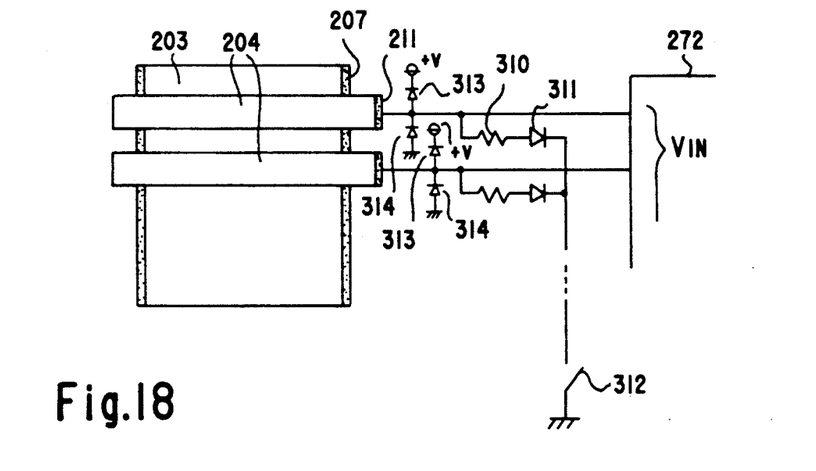
FIGS. 18, 19 and 20 are views of modifications of FIG. 17.

FIG. 18 shows a modification of the above construction. Here, serial circuits each consisting of a resistance 310 and a diode 311 is provided instead of the common electrode 271. The serial circuits are respectively connected to the electrodes 211 at one ends thereof and are grounded through a switch 312 at the other ends thereof. Although the switch 312 has a contact in FIG. 18, a non-contact type switch such as a transistor can be used as long as it is turned on periodically with an appropriate timing. If a certain film 204 is not contacted on the film 203 when the switch 312 is turned on, the electrode 211 of the film 204 gets the ground-level potential by the resistance 310 and the diode 311. If the film 204 is contacted on the film 203 when the switch 312 is turned on, the potential of the electrode 211 is changed to the potential of the film 203. Accordingly, whether the films 203 and 204 are contacted on each other or not is judged in the following way: if the input $V_{IN}$ of the A/D converter 272 is lower than the reference input $V_{REF}(-)$ (now shown) when the switch 312 is turned on, the touch panel is not pushed; if the input $V_{IN}$ is higher than the reference input $V_{REF}(-)$ when the switch 312 is turned on, the touch panel is pushed. In the latter case, the switch 312 is then turned off and the pushed position is detected. It is desirable that protecting diodes 313 and 314 are provided respectively between the $+V$ and the electrode 211 and between the electrode 211 and the ground. The protecting diodes 313 and 314 prevent the input voltage of the A/D converter 272 from being broken by the induced voltage when switch 312 is off with the touch panel not being pushed.

Figure 17:
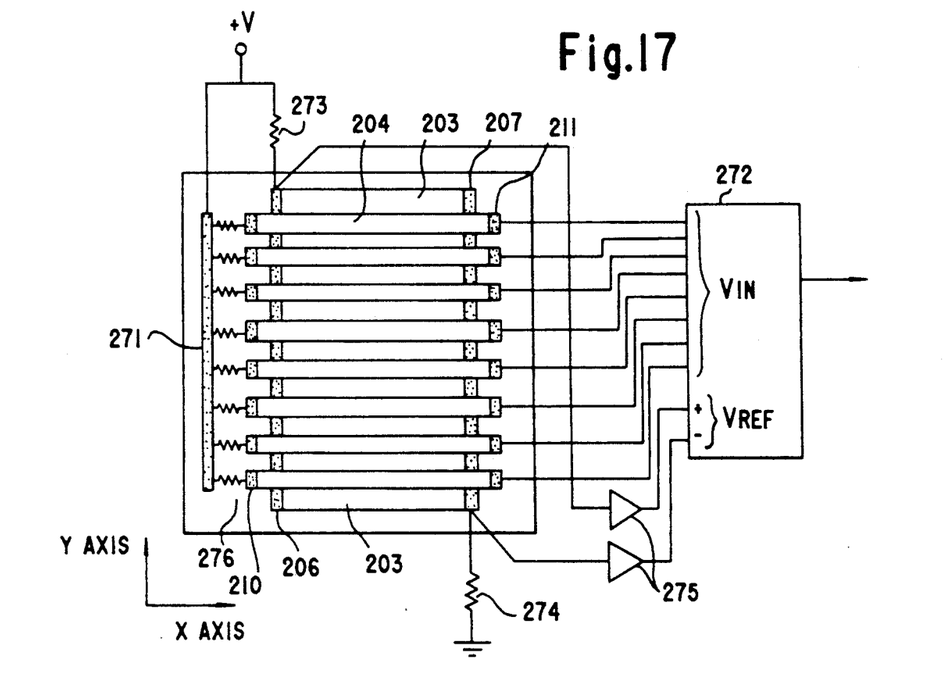
FIG. 17 is a view of still another embodiment of this invention.
Figure 19:
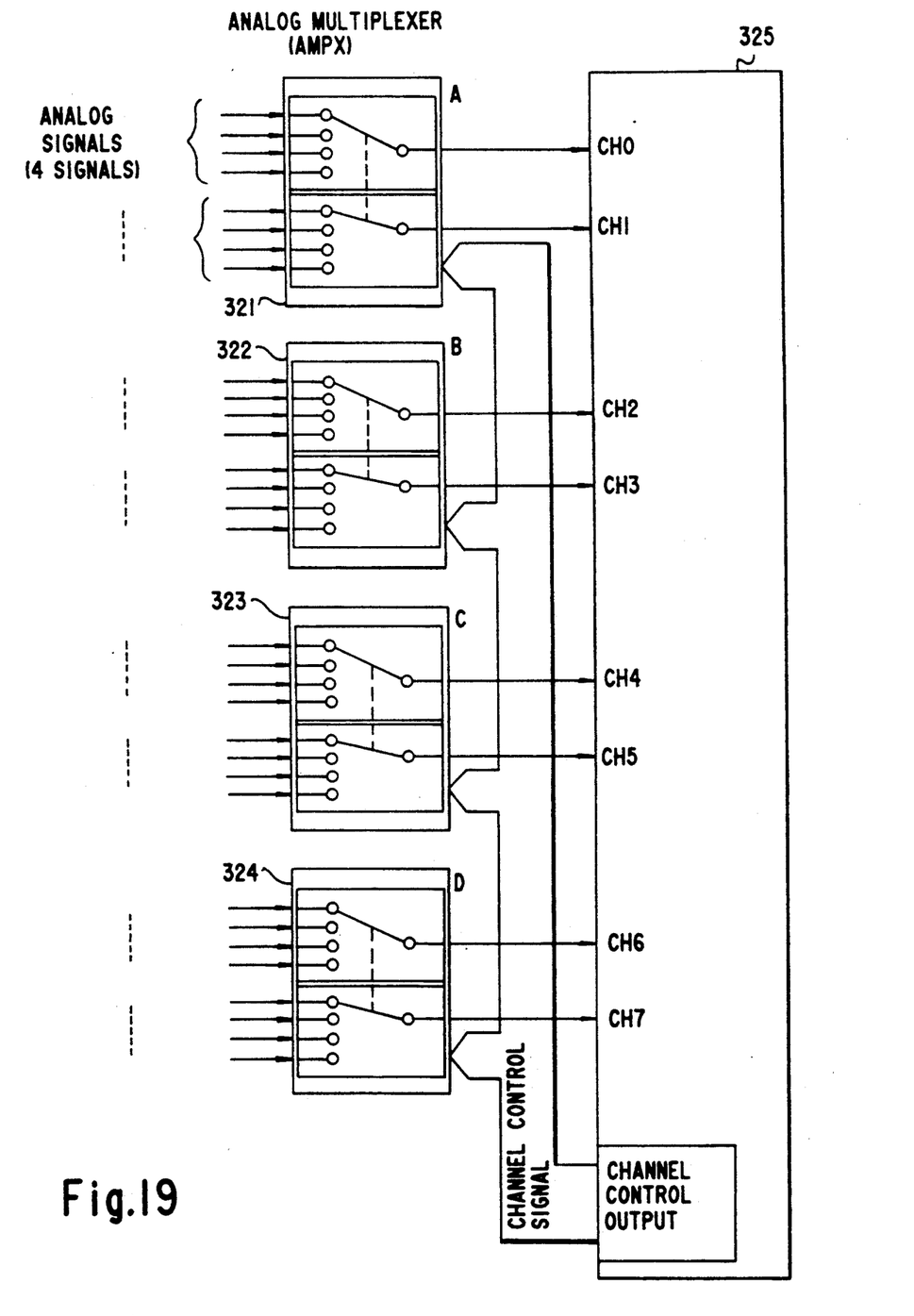

FIG. 19 shows another modification of FIG. 17. In the construction of FIG. 17, the A/D converter 272 has the same number of terminals as the number of the film 204. However, an A/D converter usually has 8 input terminals. This means two or more expensive A/D converters are required if the number of terminals are increased to 16, 24, or even 32. The sixth embodiment is proposed to solve this problem of high cost. Used as the A/D converter is a single-chip microcomputer with a built-in A/D converter (will be referred simply to A/D converter, hereinafter), and a multiplexer is provided at the input side of each A/D converter. The plurality of the films 204 are connected to the A/D converter one by one by the multiplexer.

Practically, this embodiment has the following construction. Four commercially available ICs 321 through 324 (74HC4052 manufactured by NEC Corporation), each having two 4-input, 1-output multiplexers, are used. The outputs from the ICs 321 through 324 are supplied to an A/D converter 325 having 8 input terminals. Which output should be supplied to the A/D converter 325 is controlled moment by moment by a channel control signal supplied from the A/D converter 325.

Since this construction has 32 inputs in all, it can be applied to a touch panel having up to 32 strip-like films.

Figure 20:
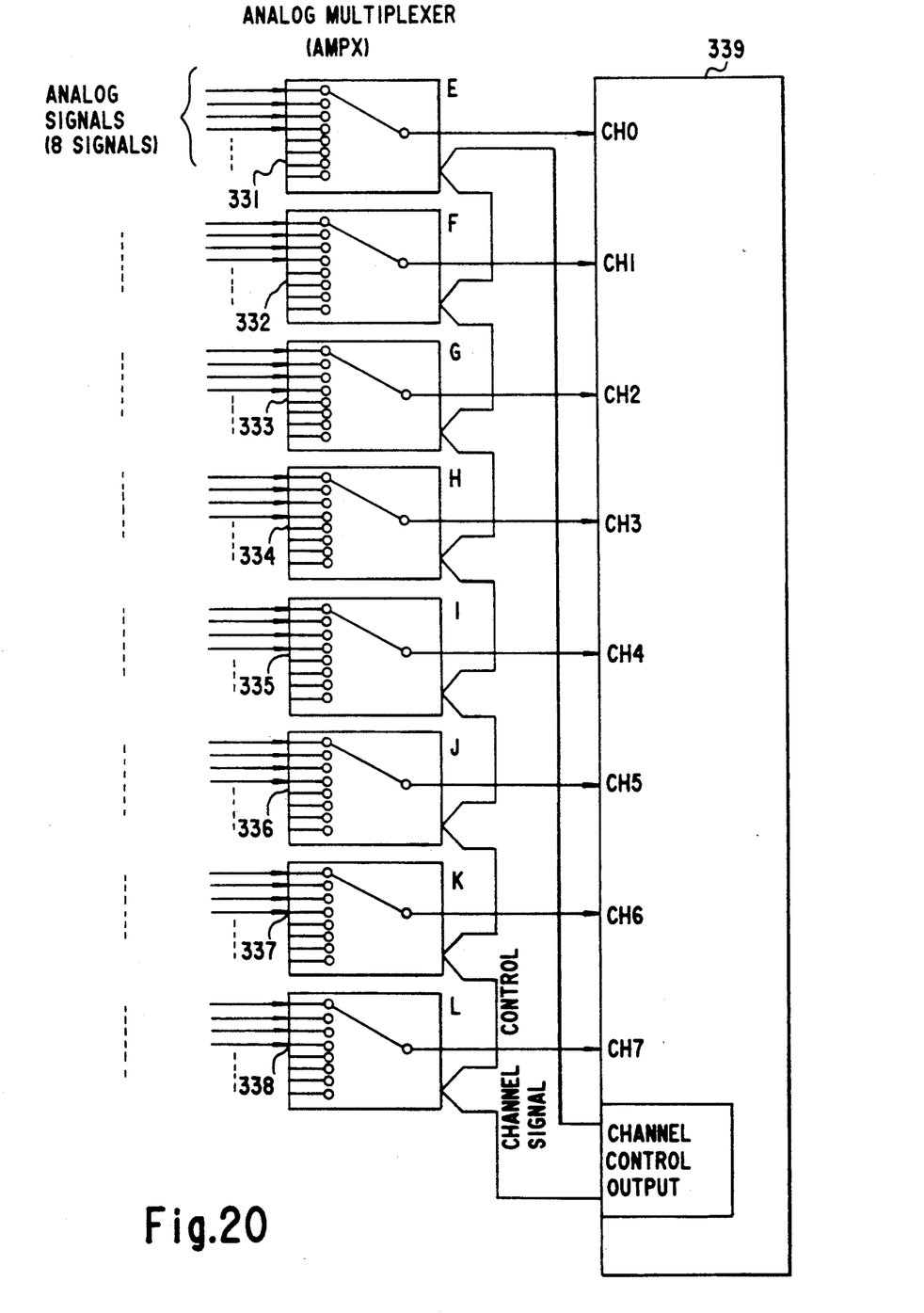

FIG. 20 shows still another embodiment in which 8 commercially available ICs 331 through 338 (74HC4051 manufactured by NEC Corporation), each of which has an 8-input, 1-output multiplexer, are used. An A/D converter 329 has 8 input terminals. Which output should be supplied to the A/D converter is controlled by the channel control signal. This construction can be applied to a touch panel having up to 64 strip-like films.

In all the above embodiments, the lengthy strip-like films cross the two-dimensional film perpendicularly. However, they may be deflected if a little. Theoretically, it is acceptable if only the strip-like films cross the Y axis.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An input system including a resistance film touch panel and a pushed position detecting device for detecting two-dimensional coordinates of a pushed position of a tough panel based on surface resistance values of resistance films, the system comprising:
   a pair of insulating base layers opposed to each other with a certain distance therebetween;
   a spacer provided between said insulating base layers for keeping said layers apart but for allowing said layers to approach each other when an external force is applied to one of said layers;
   a first resistance film extended in first and second directions and provided on an inner surface of one of said layers, the first and second directions crossing each other perpendicularly and said first resistance film having outer connecting electrodes on both ends thereof along the second direction;
   a plurality of second resistance films provided on an inner surface of the other of said layers, said second resistance films each being a lengthy strip extended in a direction crossing the second direction and having first and second outer connecting electrodes at both ends thereof;
   first potential supplying means for supplying said first resistance film with a DC potential through one of the outer connecting electrodes of said first resistance film;
   a first switch electrically connected with all the other connecting electrodes of said second resistance films one by one, alternately for said each second resistance film;
   a second switch switched in synchronization with the first switch and electrically connected to the other connecting electrode which is opposed to the outer connecting electrode connected to the first switch;
   second potential supplying means for supplying said second resistance films with a DC potential through the first switch; and
   electric potential measuring means for measuring potentials of the second resistance films through the first switch.

2. A system of claim 1, wherein said second resistance films are extended in the first direction.

3. A system of claim 1, wherein said second resistance films each have a larger resistance value than said first resistance film.

4. An input system including a resistance film touch panel and a pushed position detecting device for detecting two-dimensional coordinates of a pushed position of a touch panel based on surface resistance values of resistance films, the system comprising:
   a pair of insulating base layers opposed to each other with a certain distance therebetween;
   a spacer provided between said insulating base layers for keeping said layers apart but for allowing said layers to approach each other when an external force is applied to one of said layers;
   a first resistance film extended in first and second directions and provided on an inner surface of one of said layers, the first and second directions crossing each other perpendicularly and said first resistance film having outer connecting electrodes on both ends thereof along the second direction; and
   a plurality of second resistance films provided on an inner surface of the other of said layers, said second resistance films each being a lengthy strip extended in a direction crossing the second direction and having first and second outer connecting electrodes at both ends thereof;
   DC potential supplying means including a first switching means for supplying a DC potential to said second resistance films one by one;
   second switching means switching at a speed at least twice as high as the DC potential supplying means, said second switching means being for supplying a DC potential to the outer connecting electrodes of said first resistance film alternately; and
   electric potential measuring means for measuring the potential of the outer connecting electrode of said first resistance film, the electrode being opposed to the electrode supplied with the DC potential by the switching means.

5. A system of claim 4, wherein said second resistance films are extended in the first direction.

6. A system of claim 4, wherein said second resistance films each have a larger resistance value than said first resistance film.

7. A resistance film tough panel of claim 4, wherein an upper one of said pair of insulating base layers is a transparent film and a lower one of said pair of insulating base layers is a transparent and hard plate.

8. An input system including a resistance film touch panel and a pushed position detecting device for detecting two-dimensional coordinates of a pushed position of a touch panel based on surface resistance values of resistance films, the system comprising:
   a pair of insulating base layers opposed to each other with a certain distance therebetween;
   a spacer provided between said insulating base layers for keeping said layers apart but for allowing said layers to approach each other when an external force is applied to one of said layers;
   a first resistance film extended in first and second directions and provided on an inner surface of one of said layers, the first and second directions crossing each other perpendicularly and said first resistance film having outer connecting electrodes on both ends thereof along the second direction;
   a plurality of second resistance films provided on an inner surface of the other of said layers, said second resistance films each being a lengthy strip extended in a direction crossing the second direction and having an outer connecting electrode at one end thereof;
   DC potential supplying means for supplying said first resistance film with a DC potential through both the outer connecting electrodes thereof;
   a switch switched to a first state of supplying all the other connecting electrodes of said second resistance films with a ground-level potential and to a second state of releasing the same from the ground-level potential; and electric potential measuring means for measuring the potentials of all the other connecting electrodes of said second resistance films both in the first and the second states.

9. A system of claim 8, wherein the pair of insulating base layers consist of a flexible upper base layer on which an external force is applied and a hard lower base layer opposed to the upper base layer with a spacer therebetween, and said first resistance film is formed on a lower surface of the upper base layer and said second resistance films are formed on an upper surface of the lower base layer.

* * * * *